Feb. 12, 1929.
A. A. GLIDDEN ET AL
1,701,611
SOLE FOR BOOTS AND SHOES
Filed July 22, 1927
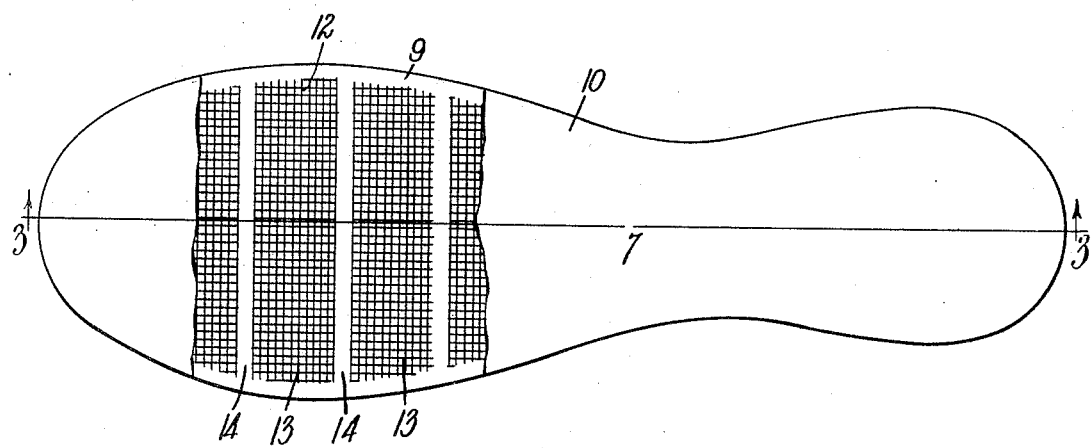
Fig.1.
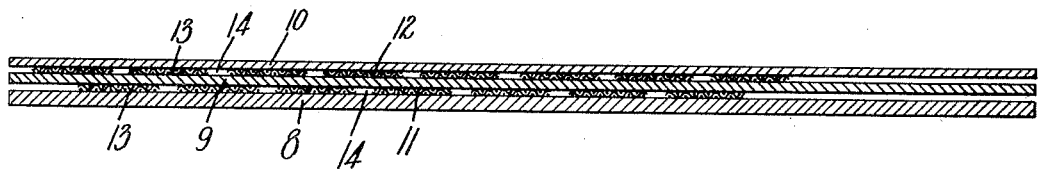
Fig.2.
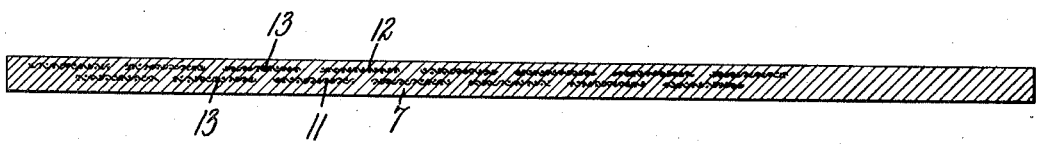
Fig.3.
Fig.6.
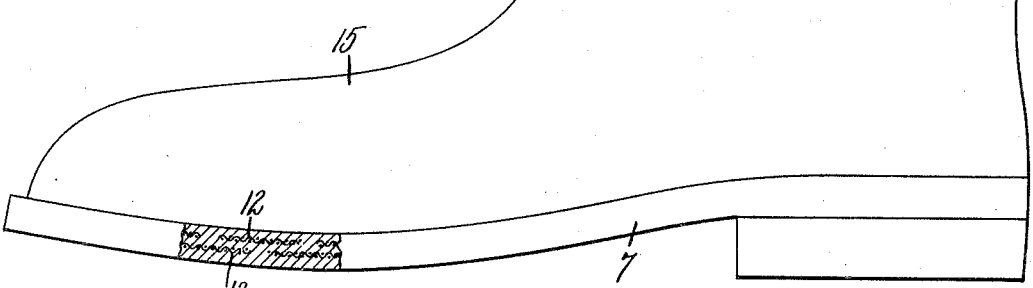
Fig.4.
Fig.5.
Inventors.
Alfred A. Glidden.
Thomas M. Knowland.
by Charles S. Gooding atty.

Patented Feb. 12, 1929.

1,701,611

UNITED STATES PATENT OFFICE.

ALFRED A. GLIDDEN AND THOMAS M. KNOWLAND, OF WATERTOWN, MASSACHUSETTS, ASSIGNORS TO HOOD RUBBER COMPANY, OF WATERTOWN, MASSACHUSETTS, A CORPORATION OF MASSACHUSETTS.

SOLE FOR BOOTS AND SHOES.

Application filed July 22, 1927. Serial No. 207,789.

This invention relates to an improvement in soles for boots and shoes and to a process for manufacturing the same.

The object of the invention is to provide a rubber sole for boots and shoes and particularly a sole for a molded rubber boot, which will be impervious to nails or other sharp articles which might penetrate the sole and cause injury to the foot of the wearer. This object is attained by embodying in a rubber sole a flexible metallic layer or layers so constructed and arranged within said sole that they will be firmly bonded therein and the flexibility of the sole retained.

The invention consists in a sole for boots and shoes and in a process for manufacturing the same as set forth in the following specification and particularly as pointed out in the claims thereof.

Referring to the drawings:

Figure 1 represents a plan view of a sole embodying our invention, a portion thereof being broken away to expose a layer consisting of a plurality of flexible metallic members.

Fig. 2 is a vertical section through the layers of material comprising the sole before said layers have been compressed together, and illustrating a step in the process of forming the sole.

Fig. 3 is a vertical section through the finished sole as taken on the line 3—3 of Fig. 1.

Fig. 4 is a side elevation of the lower portion of a rubber boot, a sole embodying our invention being embodied therein and a portion of said sole being broken away and illustrated in section.

Fig. 5 is a vertical section through a portion of a sole, illustrating a modified embodiment of our invention.

Fig. 6 is a vertical section through a sole illustrating another modified embodiment of our invention.

Like numerals refer to like parts throughout the several views of the drawings.

In the drawings, referring to Figs. 1 to 4 inclusive, 7 represents a sole embodying therein a lower layer of rubber 8, an intermediate layer of rubber 9 and an upper layer of rubber 10. Interposed between the layers of rubber 8 and 9 is a layer of flexible metallic material 11, and interposed between the layers of rubber 9 and 10 is a layer of flexible metallic material 12. The layers 8, 9 and 10 of rubber extend for the full length of the sole 7, while the layers 11 and 12 of metallic material extend from the front of the sole to a point adjacent to the front of the heel portion thereof only.

Each of the metallic layers 11 and 12 consist of a plurality of strips 13 of woven wire fabric, said strips preferably extending transversely across the sole between the layers of rubber, the adjacent edges of said strips being separated from each other by spaces 14. The strips 13 of the metallic layers 11 and 12 are furthermore positioned in staggered relation to each other, the strips of the lower layer 11 being located beneath the spaces 14 of the upper layer 12, thereby providing protection for the entire front portion of the sole with the exception of a narrow marginal portion adjacent to the edge of said sole.

In the process of forming the sole, the alternate layers of rubber of suitable consistency, and strips of wire fabric 13 are first superimposed one upon another as illustrated in Fig. 2, after which said superimposed layers are compressed in any suitable manner to expel any air that may be trapped between said layers. During this pressing operation the rubber of the various layers is forced through the interstices of the wire fabric and finally the sole, with the layers of metal 11 and 12 therein, is molded and vulcanized to form the completed sole illustrated in Fig. 3. During the vulcanizing operation the rubber on the opposite sides of the layers 11 and 12 of wire fabric will be bonded together through the interstices of said fabric.

It is evident that the sole of this invention may be utilized as an outer sole for all types of boots and shoes, said sole being attached to the upper of the shoe by any well-known method, or the sole may be employed as an inner sole, in which case it may be inserted within a boot or shoe in the usual well-known manner and when so employed it is evident that it will protect the foot against nails or other pointed articles which, upon being stepped upon, might penetrate the outer sole of the shoe and injure the foot of the wearer.

In Fig. 4 the sole 7 is illustrated as being employed as an outer sole for a rubber boot 15, and it is evident that said sole may be attached to or formed integral with the upper for said boot by any suitable method.

In Fig. 5 we have illustrated a modified embodiment of our invention in which a sole 16, formed by the process hereinbefore mentioned, embodies therein a plurality of metal members 17 consisting of strips of flexible sheet metal positioned with their adjacent edges spaced apart at 18 and with the strips of a lower layer opposite spaces 18 of an upper layer in exactly the same manner as the strips of wire fabric previously mentioned, and in this embodiment of the invention the strips of flexible sheet metal provide a protection to the foot of the wearer in exactly the same manner as does the construction illustrated in Figs. 1 to 4 inclusive.

In Fig. 6 still another modified embodiment of the invention is illustrated in which a sole 19 has one continuous piece of woven wire fabric 20 positioned therein, said continuous piece of fabric extending from the front of the sole to a point adjacent to the front of the heel portion thereof. In this embodiment of the invention the rubber upon the opposite sides of the metal fabric is bonded together through the interstices of said fabric during the molding and vulcanizing operation, and it is evident that a sole so constructed will provide an efficient protection for the foot of the wearer.

It is evident that the wire fabric employed in the sole of this invention may be constructed of any suitable gage wire and have any suitable sized mesh, and the various layers of rubber may be of any desirable thickness, the lower layer preferably being the thickest.

While we have employed the term "rubber" throughout the specification and claims, we wish it distinctly understood that this term applies to all gum or rubber compounds, and to all compositions of materials having the qualities of rubber or that are employed as substitutes therefor, or that are the equivalent thereof.

We claim:—

1. A sole for boots and shoes having, in combination, a body portion comprising a plurality of layers of rubber and metal strips spaced apart edgewise and located within said body portion between said layers of rubber, the metal strips of different layers being positioned in staggered relation to each other.

2. A sole for boots and shoes having, in combination, a body portion comprising a plurality of layers of rubber and metal layers between said layers of rubber, said metal layers each comprising a plurality of metal strips spaced apart and positioned with their edges adjacent to each other, the metal strips of different layers overlapping each other and being positioned in staggered relation to each other.

3. A sole for boots and shoes having, in combination, a body portion comprising a plurality of layers of rubber and a plurality of strips of woven wire fabric extending transversely of said sole between each of said layers of rubber, the strips of different layers overlapping each other and being positioned in staggered relation to each other.

In testimony whereof we have hereunto set our hands.

ALFRED A. GLIDDEN.
THOMAS M. KNOWLAND.